United States Patent [19]

Rawdon et al.

[11] Patent Number: 5,542,798
[45] Date of Patent: Aug. 6, 1996

[54] RESTRAINING AND TENSIONING APPARATUS FOR A CARGO TIE-DOWN BELT

[75] Inventors: Blaine K. Rawdon, Rancho Palos Verdes; Myles A. Rohrlick, Oceanside, both of Calif.

[73] Assignee: McDonnell Douglas Corporation, Huntington Beach, Calif.

[21] Appl. No.: 322,701

[22] Filed: Oct. 13, 1994

[51] Int. Cl.⁶ ................................................. B25B 25/00
[52] U.S. Cl. .................... 410/100; 410/103; 24/68 CD
[58] Field of Search ............................ 410/96, 100, 103; 24/68 R, 68 CD, 68 CT, 69 ST

[56] References Cited

U.S. PATENT DOCUMENTS

| | | | |
|---|---|---|---|
| 772,157 | 10/1904 | Koehler | 410/100 |
| 3,180,623 | 4/1965 | Huber | 24/68 CD |
| 3,584,835 | 6/1971 | White | 24/68 CD |
| 3,592,442 | 7/1971 | Zumbo | 24/68 CD |
| 4,622,721 | 11/1986 | Smetz et al. | 24/68 CD |
| 5,070,582 | 12/1991 | Anderson | 24/68 CD |
| 5,205,020 | 4/1993 | Kamper | 24/68 R |

Primary Examiner—Karen B. Merritt
Assistant Examiner—Gregory A. Morge
Attorney, Agent, or Firm—George J. Netter; John P. Scholl

[57] ABSTRACT

Restraining and tensioning apparatus (10) for a cargo tie-down belt (12) has a chassis (26) with a fluted spindle (98) onto which the belt is wound, ratchet gears (120,122), tensioning lever (28), and two pairs of locking pawls (136, 138, 148, 150), each locking pawl being engaged by an individual spring urging the pawl into contact with a ratchet gear.

6 Claims, 6 Drawing Sheets

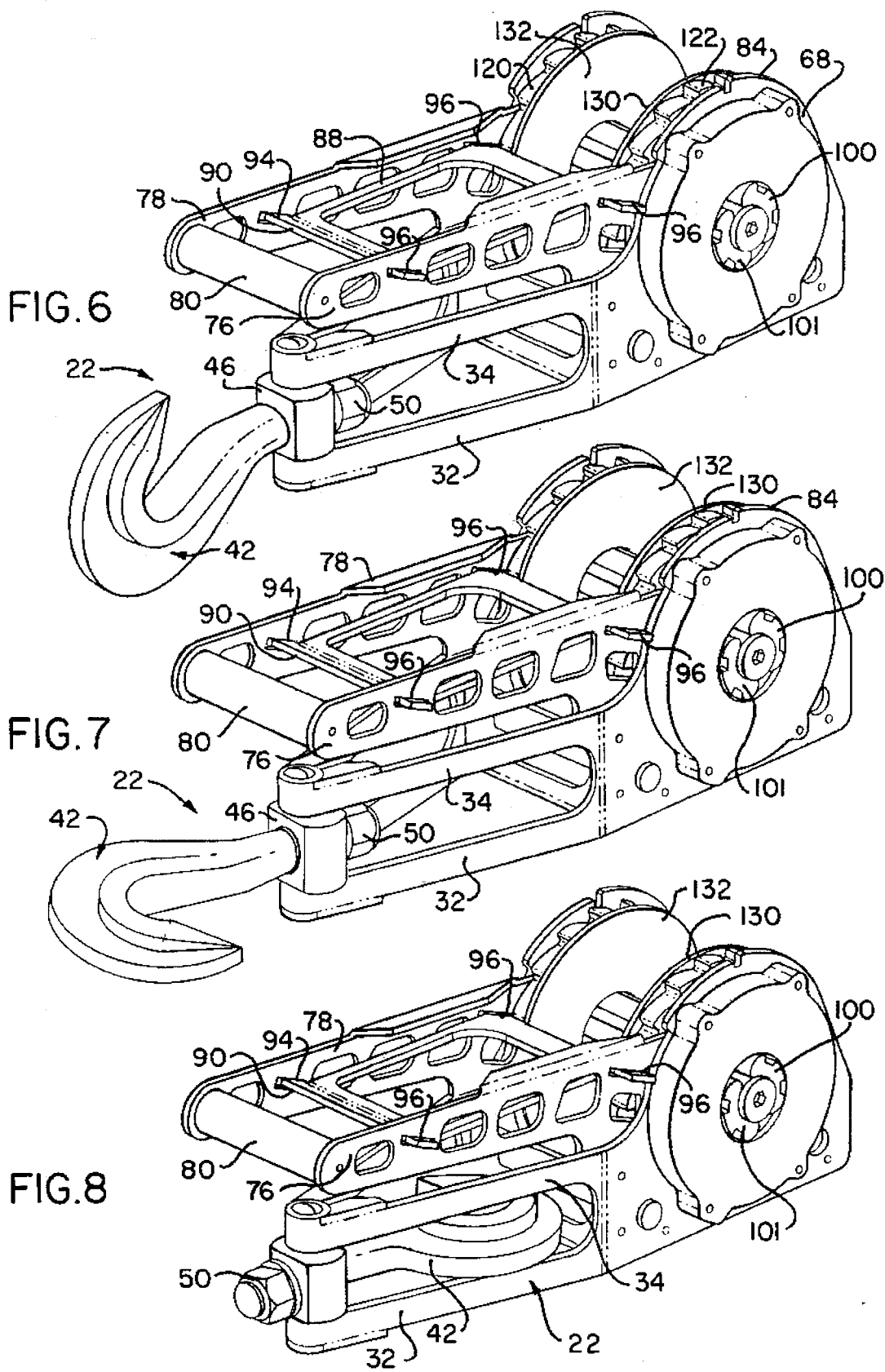

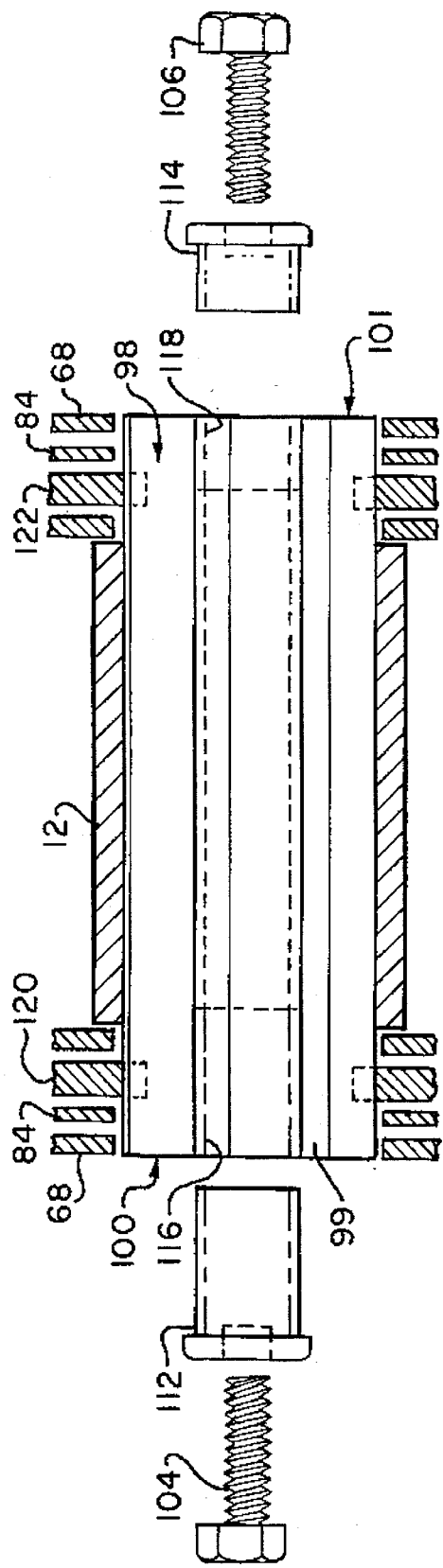
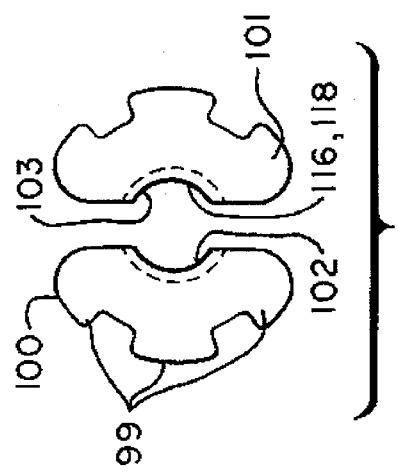
FIG.13A
FIG.13B

RESTRAINING AND TENSIONING APPARATUS FOR A CARGO TIE-DOWN BELT

FIELD OF THE INVENTION

This invention pertains generally to apparatus for restraining and tensioning a belt hooked to or arranged about a portion of cargo to prevent undesirable shifting or movement.

DESCRIPTION OF RELATED ART

There are frequent situations, such as aircraft carried cargo, where it is important to restrain the cargo against shifting during transport which if allowed to occur could present a risk of damage or injury to the aircraft or personnel. An excellent apparatus for accomplishing this purpose is disclosed in U.S. patent application Ser. No. 08/154,502, Securing and Tensioning Apparatus for a Tie-Down Strap by K. Rawdon and M. Rohrlick filed on Nov. 19, 1993, assigned to the same assignee as the present application. Briefly, the disclosed apparatus is selectively interrelated with a tie-down strap, the latter being connected by a hook to a securing ring on an item of cargo. A further hook is releasably secured to a tie-down ring on the aircraft floor, for example, and the apparatus is manipulable by hand operation to tension the strap to the point where a sufficient restraining force is applied between the cargo and the aircraft floor to prevent undesirable shifting of the cargo during transport. The apparatus of the referenced patent application is readily released and removed from restraining mode to take the cargo from the craft at the conclusion of support.

SUMMARY OF THE INVENTION

In the present invention there is provided apparatus for tensioning a cargo tie-down belt having spindle means about which the tie-down strap can be selectively wound during tensioning, and which belt has a hook for releasable connection with a securing ring on the load or cargo. A further hook on the apparatus body releasably interconnects the apparatus with a ring affixed to, say, the floor of the chamber within which the cargo is located. A tensioning lever is movable back and forth through a predetermined angular extent of operation to tension (i.e., take up) the strap and in that way to restrain the cargo.

A pair of ratchet gears within the apparatus have their teeth so spaced that the tensioning stroke does not exceed approximately 20° and there is a swing of approximately 50° for the release stroke. This predetermined total stroke is less than that of known devices permitting operation in closer proximity to surrounding obstacles. Also, reducing the pitch of the ratchet teeth on the ratchet gears enhances precision with which the apparatus can tension the strap or belt is achieved.

Two pairs of locking pawls (one pair for each ratchet wheel) are provided for locking against the ratchet teeth and preventing reversed movement of the ratchet wheels during tensioning. Each of the pawls for one of the ratchet gears is mounted on a shaft which includes a corresponding pawl from the other ratchet gear. With this mounting arrangement and with separate springs for each of the locking pawls resiliently urging the pawl into engagement with the ratchet teeth, in the event of a single spring failure on each of the commonly mounted pawls, there would still be no failure of ratchet engagement, and thereby reverse rotation is prevented.

The hook on the apparatus body is rotatably mounted as well as swingably mounted so that the apparatus may be both rotated and tilted from side to side as required to clear adjacent obstacles. The swinging motion of the hook also enables it to be retracted to a suitable storage position within the apparatus body which reduces the space required to store the entire apparatus.

Chassis plates are provided at opposite sides of the apparatus and, as their name implies, provides a housing structure for a spindle on which the belt is wound and to which the ratchet gears are mounted. The chassis plate on each side is a unitary structure which reduces the possibility of misalignment as compared with a multipiece construction. This is important in that it has been found that even slight misalignment may produce binding and possible inoperability of the apparatus.

BRIEF DESCRIPTION OF THE DRAWINGS

FIGS. 6, 7 and 8 show different positions of the apparatus connection hook during operation;

FIGS. 13A and 13B depicts an exploded view of the spindle and associated parts.

DESCRIPTION OF A PREFERRED EMBODIMENT

Figure 1:
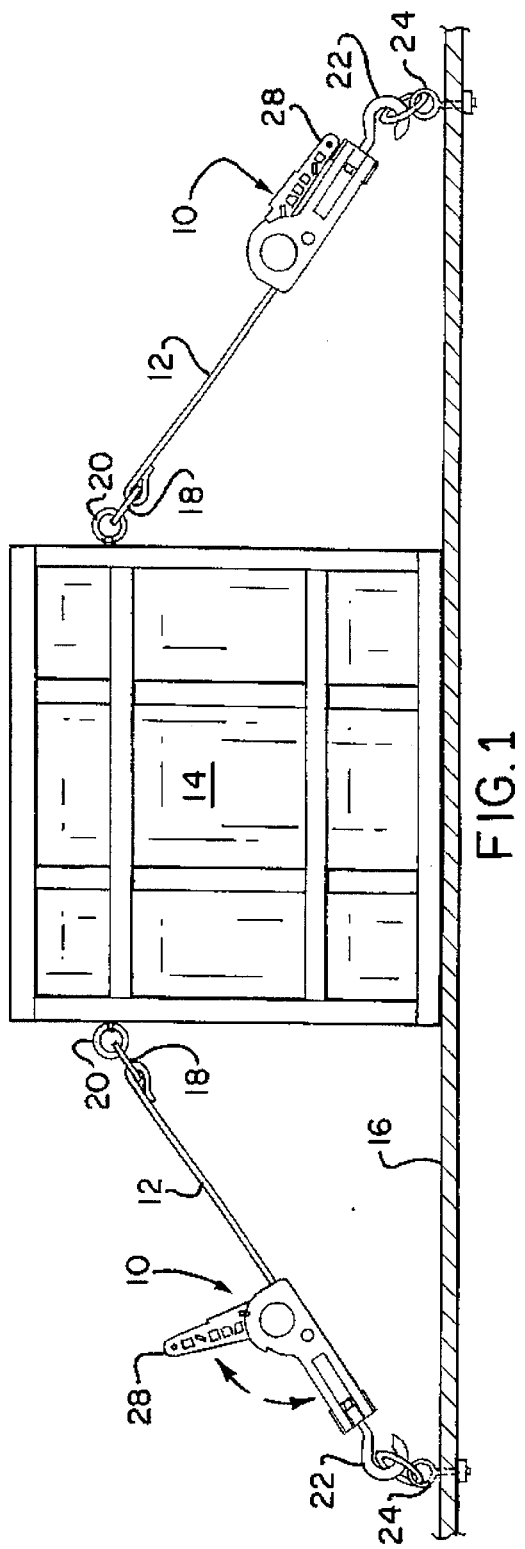
FIG. 1 is an elevational, schematic view of the restraining and tensioning apparatus shown in use.

Turning now to the drawings and particularly FIG. 1, a belt restraining and tensioning apparatus 10 is in its most general aspects a device for taking up (i.e., tensioning) a flat elongated belt or strap 12 to secure cargo 14 in a vehicle chamber to a floor member 16, and, as will be particularly described herein, the invention is considered most advantageously employed for securing relatively large and heavy cargo of many tons to an aircraft storage compartment floor where space between the cargo and other adjacent cargo or compartment walls is typically at a minimum.

The belt 12 is preferably elongated and flexible with parallel side edges and may be made of a woven plastic material, for example. The outer end of the belt is interconnected with a hook-like attachment means 18 which in the usual situation releasably interconnects with a securing ring 20 affixed to the cargo 14. The other end of the strap, in a way that will be more particularly described, is received within the apparatus 10 and wound up therein by operation of a hand operated tensioning lever in order to shorten up the distance between the device 10 and the hook end of the belt 12. Unitary with the apparatus 10 is a further hook 22 which in use releasably interconnects to a ring 24 secured to the floor 16.

Release of the belt to remove the cargo is simply accomplished by unlocking the tension belt which enables it to be pulled loose from the apparatus 10 a slight amount after which the hook 22 and the hook-like attachment means 18 can be removed from the respective rings 20, 24 permitting the belt and apparatus 10 to be stowed away for later use.

Figure 2:
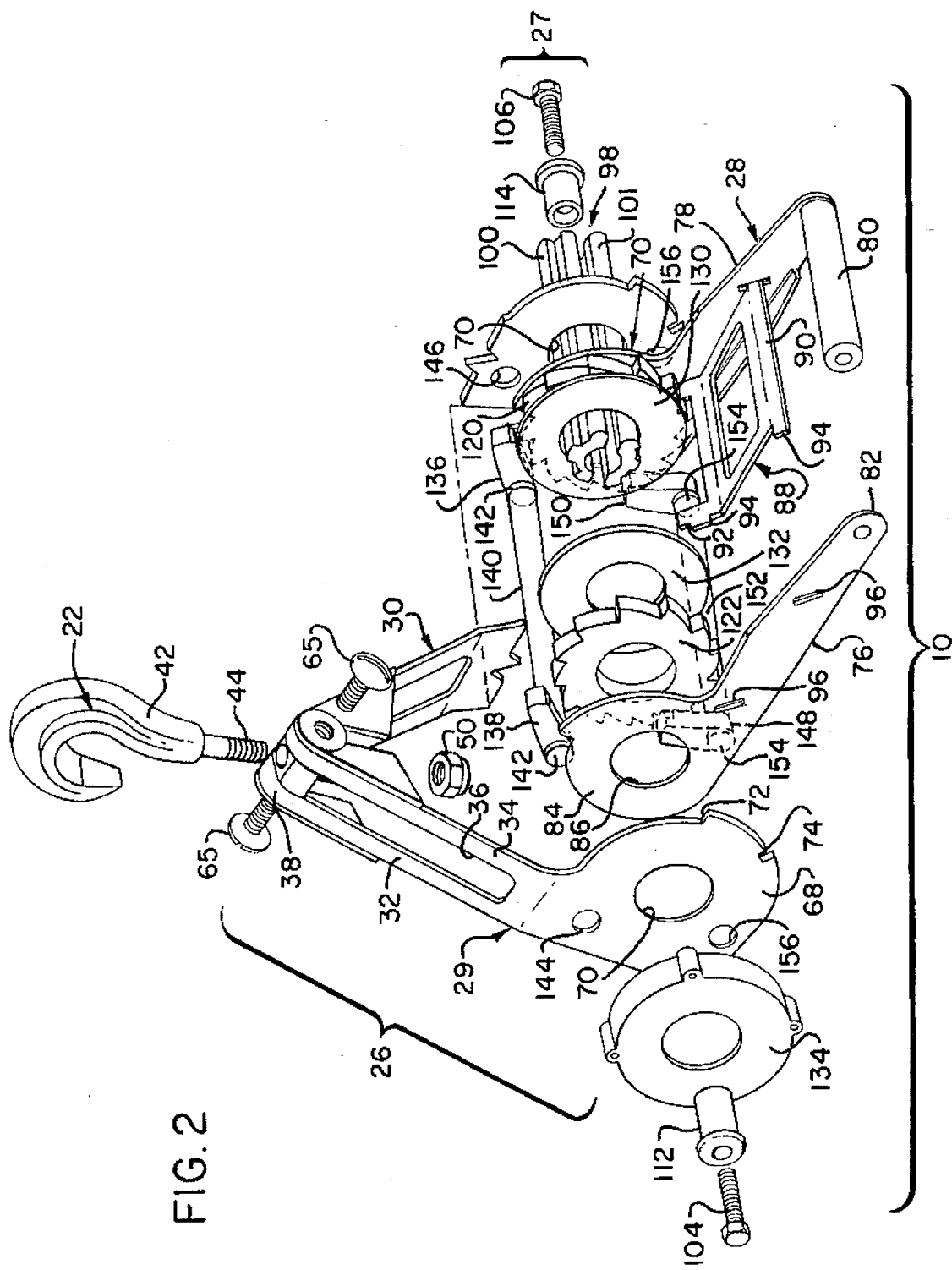
FIG. 2 is an exploded view of the described apparatus.

Major parts of the tensioning and locking apparatus 10 of this invention to be more particularly described include a chassis 26 with the hook 22 affixed to one end (FIG. 2). A spindle 27 is rotatably mounted to the chassis and receives the belt end (without means 18) in a securing manner and the belt is wound about the spindle during the tensioning mode of use. A tensioning lever 28 is hand manipulable over a restricted predetermined angular amount to produce belt winding onto the spindle and accordingly tensioning of the belt with respect to the cargo.

Turning now especially to FIG. 2, the chassis 26 is seen to be constructed from a single metal plate which is formed into a wrap-around configuration providing two side plates 29 and 30 of substantially identical construction and dimensions. Specifically, the side plate 29 being described as representative of the two plates includes an elongated portion defined by two arms 32 and 34 separated by a central opening 36. The arms of the two plates 29 and 30 join one another at the connection portion identified generally as 38 which encloses a rounded journaling area 40 to receive the hooklike attachment means 22 as will be more particularly described.

The hooklike attachment means 18 is of conventional construction and connected to the belt or strap 12 outer end in any suitable manner.

Figure 10:
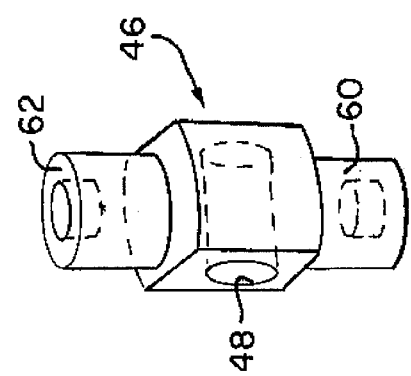
FIG. 10 is a perspective view of a rotor used to mount the connection hook to the described apparatus.
Figure 9:
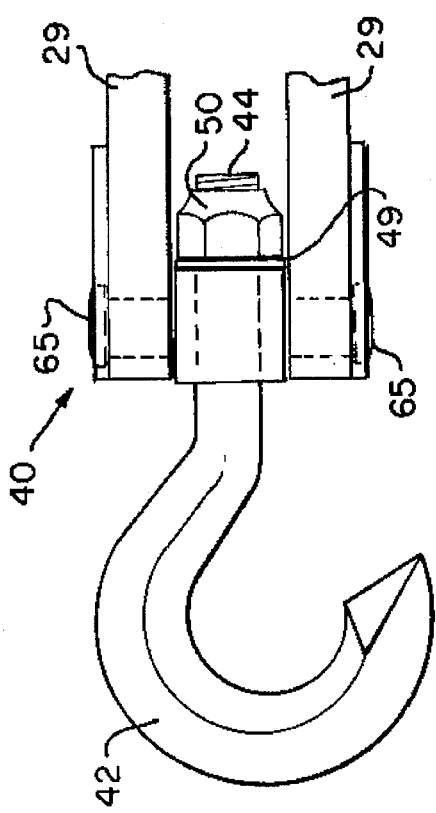
FIG. 9 is an enlarged elevational view of a first version of the apparatus connection hook.

For the ensuing detailed description of the hook attachment means 22 and its manner of mounting to the chassis, reference is made simultaneously to FIGS. 2, 9 and 10. The attachment means 22 includes a hook 42 having an elongated threaded connection shaft 44. A rotor body 46 of generally cylindrical shape has an opening 48 extending transversely therethrough of a diameter sufficient to receive the shaft 44 of the hook 42 for rotation therein. The shaft 44 when received fully within opening 48 has an end portion that extends outwardly of the rotor body. In a first version shown in FIG. 9, the shaft 44 is received through opening 48 of rotor 46 with its outer end secured in place by a washer 49 and nut 50.

In a further version (FIG. 12) of the attachment means 22, the exposed threaded end of the shaft 44 receives, ill the order described from the rotor body, a compression spring 52, and a castellated nut 54, the latter secured against rotation by a cotter pin 56. In this way the hook 42 is resiliently held to the rotor body and can rotate readily about the axis of the shaft 44 within opening 48.

Extending from each of the circular end faces of the rotor body 46 are first and second hub shafts 60 and 62 which, on assembly, extend respectively along the journaling area 40 of each of the side plates 29 and 30. Tabs 64 are provided integral with the side plates to extend toward each other leaving an open generally circular side portion of the area 40 substantially coextensive with the hub shafts. In the FIG. 12 version, as the belt is tensioned this compresses the spring 52 to provide a direct reading of the belt stress by the indicia on the tabs.

In assembly, the hub shafts are located within the respective journaling areas 40 and large flat-headed screws 65 are received within threaded openings of the hub shafts, the heads of which screws are flat and do not extend outwardly beyond the outer surfaces of the tabs 64. By this mounting arrangement the attachment means 22 provides the hook 42 with an angular adjustment range that is complete about two axes, one axis through the opening 48 and the other being the (cylindrical) axis of the two hub shafts. Adjustability is advantageous in use of the described apparatus, particularly where space may be at a premium and either the storage chamber walls or other cargo is closely adjacent. Also, the length of the opening 36 in each of the side plates 29 and 30 is such that the hook 42 may be rotated through the opening for storage totally within the chassis (FIG. 8).

With reference primarily to FIG. 2, the outer extremities of the side plate 29 are seen to terminate in an enlarged end plate 68 having an axial opening 70 and an edge formed into a limit stop wall 72 and a release slot 74. The side plate 30 is constructed identically to side plate 29 and, therefore, will not be separately described.

The tensioning lever 28 (FIGS. 1, 2 and 6) includes a pair of identical lever arms 76 and 78 held in spaced apart relation by a hand grip 80 affixed to all outer end 82 of each arm. Lever arm 76 is elongated with the end opposite the hand grip being enlarged into a somewhat circular end plate 84 having an opening 86 of the same dimensions as opening 70 in the side plates.

A tensioning pawl 88 slidably mounted to the tensioning lever 28 is of platelike construction having a finger-gripping edge portion 90 and a pair of driving tabs 92 on an opposite (forward) edge. Two pairs of mounting ears 94 are arranged with one pair spaced along each lateral edge. The ears are slidingly received within slots 96 in the lever arms 76 and 78 enabling movement of the pawl generally parallel to the lever arms longitudinal axis as will be more particularly described.

A spindle 98 onto which the belt or strap is wound is an elongated member of generally cylindrical cross-section having a plurality of flutes 99 formed in its periphery. More particularly, the spindle includes first and second substantially identical spindle parts 100 and 101, each of generally semi-cylindrical cross-section with semi-cylindrical openings 102 and 103 extending along one surface which face one another on assembly and the flutes 99 extending longitudinally on the outer surface of each spindle part (FIG. 13). First and second bolts 104 and 106 are threaded through cylindrical hubs 112 and 114 fitted into, respectively, receiving openings 116 and 118 in the opposite ends of the spindle 98.

First and second ratchet gears 120 and 122 each have an axial opening formed to fittingly receive the fluted spindle parts 100 and 101 in spaced apart relation and lock the gears for rotation with the spindle (FIG. 14). The peripheral edges of the gears are provided with a plurality of teeth 124, each tooth having a straight driving side 126 and an opposite curved side 128. The pitch of the ratchet teeth is approximately 20°, which provides an incrementally smaller and, therefore, more precise tensioning than other known tensioning apparatus.

In assembly of the tensioning lever, the lever arms 76 and 78 along with handgrip 80 and tensioning pawl 88 are unitarily related (FIG. 6) by threaded members (not shown) and received into the ends of the handgrip. The assembly of the remainder is accomplished by inserting the spindle parts 100 and 101 through, in the order recited, opening 70 in side plate 30, opening 86 in lever arm 78, first ratchet gear 120, a first enlarged washerlike plate 130, a second washerlike plate 132, second ratchet gear 122, lever arm 76 opening 86, and opening 70 in side plate 29. The bolts 104, 106 are threaded into the outer ends of the hubs 112 and 114. Cover plates 134 (only one of which is shown) are secured by threaded members to the end portions of 29 and 30 generally coaxial with openings 70.

Figure 5:
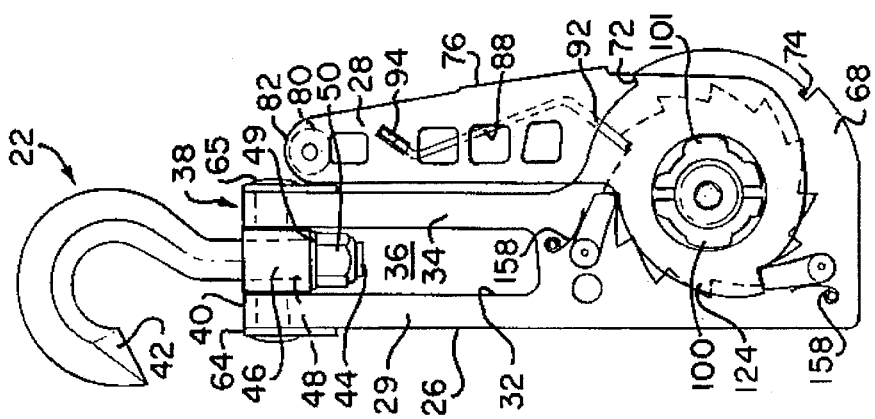
FIGS. 3, 4 and 5 depict side elevational, partially sectional views of the described apparatus in different stages of operation.
Figure 4:
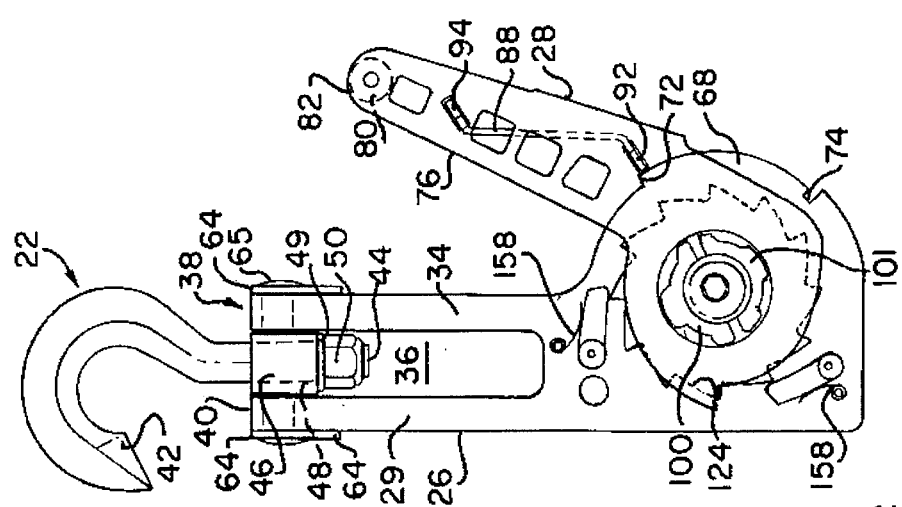

A first pair of locking pawls 136 and 138 are interconnected by a common shaft 140 and each pawl includes a stub shaft 142 axially aligned with shaft 140 for rotatable receipt within openings 144 and 146 in side plates 29 and 30, respectively. Similarly, a second pair of locking pawls 148 and 150 are similarly mounted on a single shaft 152 and each include a stub shaft 154 for receipt within openings 156 in side plates 29 and 30. As can be seen best in FIGS. 4 and 5, the end portions of the locking pawls are cammed over the ratchet wheel teeth 124 when the tensioning lever arm 28 is rotated clockwise as shown there (i.e., tensioning stroke), but when the lever arm is rotated counter-clockwise from the FIG. 4 position to that of FIG. 5, the pawls prevent movement of the ratchet gears in the same direction. Although each locking pawl is provided with a separate spring 158, because of the common shaft mounting of the pairs of pawls, failure of one spring of each common pair will not result in operational failure.

For the ensuing description of the first embodiment operation, reference is made simultaneously to FIGS. 1, 2, 4 and 5. First, the belt 12 has its hooklike attachment means 18 connected to the cargo securing ring 20 and its other end passes through the space between the two spindle parts 100 and 101 secured to the spindle 98 between the plates 130 and 132 in any conventional manner such as winding several belt loops onto the spindle, for example. It is important to note that when the spindle bolts 104 and 106 are in place with the belt thoroughly tightened and load-stressed, this causes the spindle parts to lock securely within the ratchet gears because of the reaction with the cross-bar in the ratchet gear openings. Next, the tensioning lever 28 is repeatedly moved back and forth as indicated by the arrows which causes the driving tabs 64 during the clockwise movement to rotate the ratchet gears 104, 106 (and, thus, the spindle 98) winding the belt onto the spindle. This is continued until the belt is sufficiently tensioned to secure the cargo.

Figure 11:
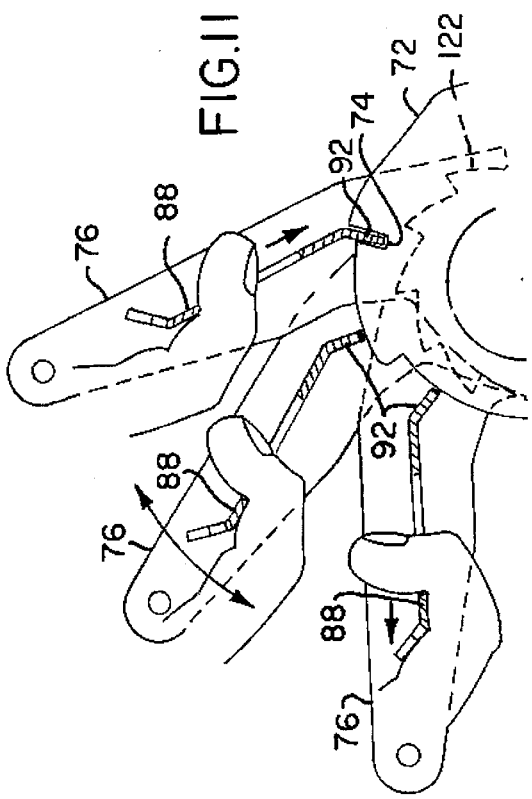
FIG. 11 is an elevational schematic view showing manipulation of described apparatus to release mode.
Figure 3:
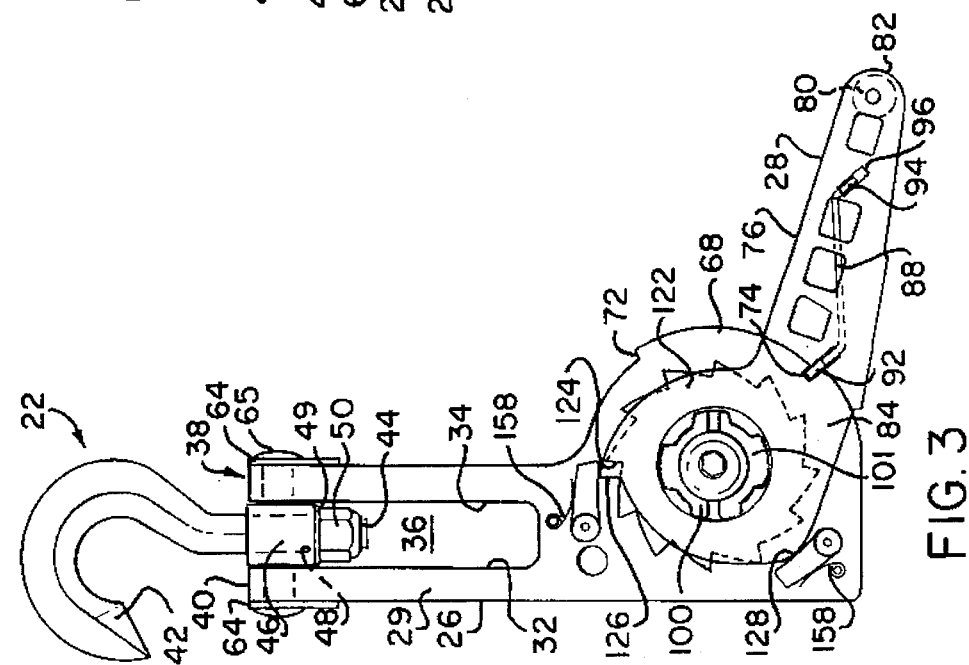

To release the belt and cargo, the tensioning pawl 88 is gripped as shown in FIG. 11 lifting the driving tabs 92 from engagement with the ratchet gear teeth, after which the lever 28 is moved to the position where the tabs 92 rest within the release slot 74 which serves to hold the driving tabs spaced away from the ratchet wheel teeth. Also, at this same time the camming surfaces 126, 128 on lever arm end plate 84 hold the locking pawls 136 and 138 out of contact with the ratchet teeth (FIG. 3). Now, the belt may be readily removed from the spindle which is free to rotate in either direction. With the tension removed from the belt both attachment means 18 and 42 may be disconnected from the rings and the cargo moved as desired.

Figure 12:
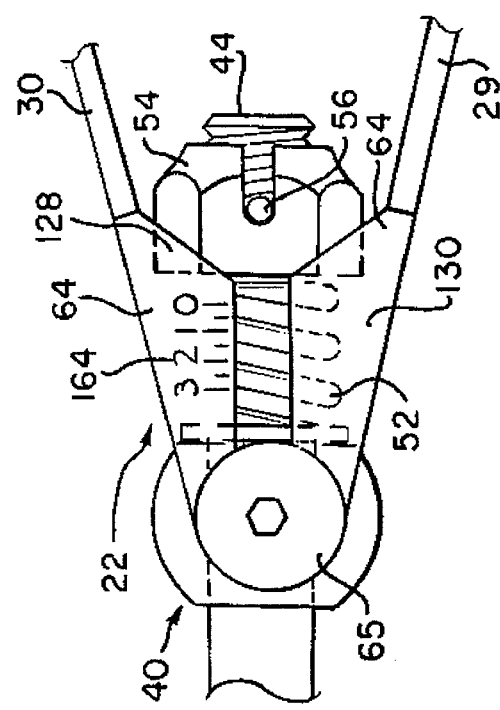
FIG. 12 depicts a modified form of hook mounting enabling measurement of load tension.

FIG. 12 depicts an alternative embodiment of the invention enabling the provision of a predetermined amount of tension in the belt 12, which may be desirable under certain circumstances. Instead of the construction of FIG. 9, the top juncture point of side plates 29 and 30 includes first and second winglike tabs 64 which have graduated indicia 164 provided on the outer surface of one tab extending away from the rotor body 46. The compression spring 52 on shaft 44 is of predetermined spring resiliency. In use, as the tension is increased in the belt, the inner edge of the nut moves toward the rotor permitting a measure of the belt tension being read directly from the indicia 164.

Although the invention is described in connection with preferred embodiments, it is to be understood that those skilled in the appertaining art may conceive of modifications that come within the spirit of the invention described and the ambit of the appended claims.

What is claimed is:

1. Apparatus for adjusting the length of a belt between a fixed member and cargo, comprising:

a chassis;

hook means rotatably and swingably mounted to the chassis for releasable interconnection externally of the said apparatus, said hook means being secured to the chassis via means enabling rotation of the hook about two generally orthogonal axes; said enabling means including a rotor body having a transverse opening, the hook means including a shaft that extends through the rotor body opening, a coil spring received on a part of the shaft extending from the rotor body, and a nut threaded on the end of the shaft;

spindle means rotatably mounted to said chassis for receiving the belt wound thereon;

ratchet gear means unitarily secured to said spindle means for rotation therewith, said gear means having a set of teeth on a peripheral surface and including two spaced apart ratchet gears each with said teeth thereon;

tensioning lever means rotatably mounted onto said spindle means for providing selective rotative motion in first and second directions;

tensioning pawl means mounted to the tensioning lever means having driving tab means engageable with the ratchet teeth for rotating the ratchet gears when the tensioning lever means is rotated in a first direction; and locking pawl means having a surface continuously contacting the ratchet teeth for preventing ratchet gear means rotation in a second direction opposite to said first direction, said locking pawl means including a first pair of spaced apart locking pawls mounted on a first shaft, a second pair of spaced apart locking pawls mounted on a second shaft, and individual spring means for engaging each locking pawl and urging the said locking pawls into contact with the ratchet gears.

2. Apparatus as in claim 1, in which said spindle means has a fluted peripheral surface; said ratchet gear means including an opening formed to receive the fluted spindle in locking relation so that the spindle means and ratchet gear means rotate together.

3. Apparatus as in claim 1, in which tabs on the chassis include indicia measuring belt tension by compression of the coil spring.

4. Apparatus as in claim 1, in which the hook means movement provided by the enabling means about one of the axes positions the hook means within the chassis for storage.

5. Apparatus for adjusting the length of a belt between cargo and a wall or floor member where the cargo is stored comprising:

a chassis having first and second arms extending angularly away from an end;

a hook rotatably and swingably mounted to the chassis end; said hook being secured to the chassis end via means enabling rotation of the hook about two generally orthogonal axes, rotation about one of said axes moving the hook between the chassis arms for storage; said enabling means including a rotor body having a transverse opening therethrough, the hook including a shaft that extends through the rotor body opening, a coil spring received on a part of the shaft extending from the rotor body, and a nut threaded on the end of the shaft;

spindle means rotatably mounted to said chassis for receiving an end of the belt to be wound thereon, said spindle means including a pair of semicylindrical spindle parts arranged in facing relation having outer end portions rotatably mounted to the chassis arms;

first and second spaced apart ratchet gears mounted onto the spindle means for simultaneous rotatable drive with the spindle means, each of said gears having teeth with approximately 20 degree spacing between teeth;

tensioning lever rotatably mounted onto said spindle means;

tensioning pawl means mounted to the tensioning lever having driving tab means engageable with the ratchet teeth for rotating the ratchet gears when the tensioning lever is rotated in a first direction; and locking pawl means having a surface continuously contacting the ratchet teeth for preventing ratchet gear means rotation in a second direction opposite to said first direction said locking pawl means including a first pair of spaced apart locking pawls mounted on a first shaft, a second pair of spaced apart locking pawls mounted on a second shaft, and individual spring means for engaging each locking pawl and urging the said locking pawls into contact with the ratchet gears.

6. Apparatus as in claim 5, in which tabs on the chassis include indicia measuring belt tension by compression of the coil spring.

* * * * *